(12) United States Patent
Hallitschke

(10) Patent No.: US 11,946,612 B2
(45) Date of Patent: Apr. 2, 2024

(54) HYBRID SURFACE ELEMENT LIGHTING APPARATUS WITH MULTIPLE ILLUMINATION FUNCTIONS

(71) Applicant: Autosystems, a division of Magna Exteriors Inc., Aurora (CA)

(72) Inventor: Frank Hallitschke, Backnang (DE)

(73) Assignee: Autosystems, a division of Magna Exteriors Inc., Aurora (CA)

(*) Notice: Subject to any disclaimer, the term of this patent is extended or adjusted under 35 U.S.C. 154(b) by 0 days.

(21) Appl. No.: 18/098,519

(22) Filed: Jan. 18, 2023

(65) Prior Publication Data

US 2023/0235871 A1 Jul. 27, 2023

Related U.S. Application Data

(60) Provisional application No. 63/330,910, filed on Apr. 14, 2022, provisional application No. 63/302,713, filed on Jan. 25, 2022.

(51) Int. Cl.
*F21S 43/249* (2018.01)
*B60Q 1/26* (2006.01)
*B60Q 1/50* (2006.01)
*F21S 43/14* (2018.01)
*F21S 43/245* (2018.01)
(Continued)

(52) U.S. Cl.
CPC ......... *F21S 43/249* (2018.01); *B60Q 1/2607* (2013.01); *B60Q 1/5035* (2022.05); *F21S 43/14* (2018.01); *F21S 43/245* (2018.01); *F21W 2105/00* (2018.01); *F21Y 2105/16* (2016.08); *F21Y 2115/10* (2016.08)

(58) Field of Classification Search
CPC ...... F21S 43/249; F21S 43/14; B60Q 1/5035; B60Q 1/2607
See application file for complete search history.

(56) References Cited

U.S. PATENT DOCUMENTS

2010/0302475 A1* 12/2010 Beraud .................. B60Q 1/268
349/61
2016/0215950 A1* 7/2016 Ender .................... F21S 43/247
(Continued)

OTHER PUBLICATIONS

3M Brightness Enhancement Films; 3M Display Materials and Systems Division; 2021 Technical Data; Feb. 2021.
(Continued)

*Primary Examiner* — Christopher E Dunay
(74) *Attorney, Agent, or Firm* — Dickinson Wright PLLC

(57) ABSTRACT

A vehicle lighting device provides two or more lighting functions using the same exit surface of a light guide panel. A first lighting function is a vehicle lighting function such as a rear tail light function or rear combination lamp function (e.g., brake signal, turn signal, and backup light) provided by a first light source comprising a light emitting diode (LED) light source inputted at an edge surface of the light guide panel. At least one more lighting function is implemented by a second light source outputting light toward a rear surface of the light guide panel and controlled to operate in accordance with one or more second light functions including one or more of: at least part of another vehicle lighting function, and a display including one or more display elements presenting at least one of: a designated pattern, a symbol, a pictogram, and an animation.

20 Claims, 7 Drawing Sheets

(51) Int. Cl.
*F21W 105/00* (2018.01)
*F21Y 105/16* (2016.01)
*F21Y 115/10* (2016.01)

(56) References Cited

U.S. PATENT DOCUMENTS

| | | | |
|---|---|---|---|
| 2016/0290588 A1* | 10/2016 | Kim | F21S 43/247 |
| 2020/0003404 A1* | 1/2020 | Hikmet | G02B 6/0001 |
| 2021/0062993 A1* | 3/2021 | Buisson | F21S 43/249 |
| 2021/0095830 A1* | 4/2021 | Hansen | F21S 43/14 |
| 2022/0017009 A1* | 1/2022 | Kaup | F21S 43/249 |
| 2022/0017099 A1* | 1/2022 | Shin | B60T 8/26 |
| 2023/0057046 A1* | 2/2023 | De Lamberterie | B60Q 1/2607 |

OTHER PUBLICATIONS

Karkafiris, Michael, "2021 Audi Q5's Next-Gen OLED Taillights Will Warn Other Cars if They Get Too Close," Jul. 30, 2020; downloaded from https://www.carscoops.com/2020/07/2021-audi-q5s-next-gen-oled-taillights-will-warn-other-cars-if-they-get-too-close/.

* cited by examiner

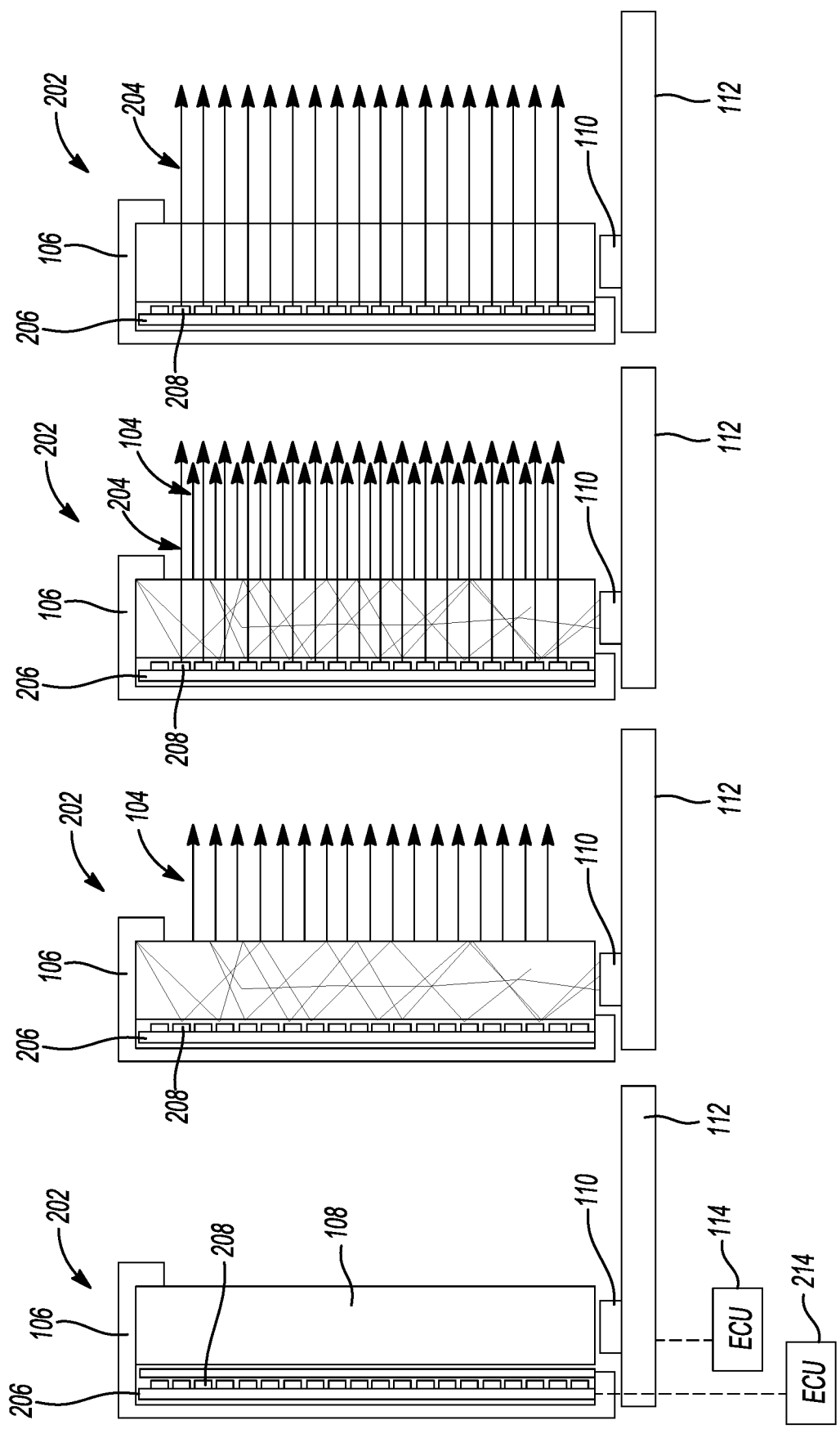

HYBRID SURFACE ELEMENT LIGHTING APPARATUS WITH MULTIPLE ILLUMINATION FUNCTIONS

CROSS REFERENCE TO RELATED APPLICATIONS

This U.S. utility patent application claims the benefit of U.S. Provisional Patent Application No. 63/302,713, filed Jan. 25, 2022, and U.S. Provisional Patent Application No. 63/330,910 filed Apr. 14, 2022, the contents of which are incorporated herein by reference in their entirety.

FIELD

The present disclosure relates to generally to a light emitting diode (LED)-based lighting device configured to provide two or more lighting functions using the same exit surface of a light guide panel.

BACKGROUND

It is known to employ semiconductor light sources, in particular light emitting diodes (LEDs), in automotive signal lights. For example, tail lights on some vehicles include an array of red light-emitting and/or amber light-emitting LEDs which are positioned between a reflector and a lens to provide the desired signal patterns.

Next to regulatory and safety concerns, aesthetic design can be one of the most significant considerations for the designer of a vehicle and, to date, the range of aesthetic design available for automotive lighting features using semiconductor light sources has been limited. A need exists for implementing vehicle lighting applications to further expand their functional and aesthetic designs.

SUMMARY

This section provides a general summary of the present disclosure and is not a comprehensive disclosure of its full scope or all of its features, aspects and objectives.

In accordance with an example embodiment, a lighting device is provided that comprises a first light source controlled to operate in accordance with a first light function corresponding to a vehicle lighting function; and a second light source comprising a plurality of light emitting diodes (LEDs) disposed on a substrate and controlled to operate in accordance with one or more second light functions including one or more of: at least part of another vehicle lighting function, and a display including one or more display elements presenting at least one of: a designated pattern, a symbol, a pictogram, and an animation. The lighting device also comprises a light guide panel having edge surfaces, a front surface, and a rear surface overlying the second light source to receive therefrom, the surface element light guide configured to receive light from the first light source via at least one of the edge surfaces and to output light from the front surface in accordance with the first light function. The light guide panel is further configured to output light from the second light source via the front surface in accordance with the one or more second light functions.

In accordance with aspects of the example embodiment, the first light source comprises LEDs arranged to input light via at least one of the edge surfaces of the light guide panel.

In accordance with aspects of the example embodiment, the plurality of LEDs of the second light source are chosen from mini LEDs and micro LEDs, and LED dies.

In accordance with aspects of the example embodiment, the LEDs in the first light source are Surface Mounted Devices (SMD) LEDs.

In accordance with aspects of the example embodiment, the lighting device further comprises a material layer configured to obscure visibility of the plurality of LEDs to a user at the front surface of the light guide panel when the second light source is powered off.

In accordance with aspects of the example embodiment, the material layer is disposed between an output surface of the second light source and the rear surface of the light guide panel.

In accordance with aspects of the example embodiment, the material layer is bonded to at least one of an exit surface of the second light source and the rear surface of the light guide panel.

In accordance with aspects of the example embodiment, the material layer includes a foil.

In accordance with aspects of the example embodiment, the material layer includes a brightness enhancement film (BEF) foil comprising a prismatic structure configured to focus light towards on-axis viewers of the front surface of the light guide panel.

In accordance with aspects of the example embodiment, the first light function includes at least one of: a brake light, a tail light, a turn signal, and a backup light.

In accordance with aspects of the example embodiment, the first light source and the second light source are controlled independently of each other.

In accordance with aspects of the example embodiment, the second light source is controlled by a controller that is configured to receive signals indicating real-time conditions via Vehicle-to-Everything (V2X) communications and to operate the second light source to output a selected display element chosen from among a plurality of display elements based on the received signals.

In accordance with aspects of the example embodiment, the one or more second light functions include two or more different second light functions, the plurality of LEDs of the second light source comprise different colors of LEDs, and LEDs having respective ones of the different colors can be controlled to operate independently of each other to provide the two or more different second light functions.

In accordance with an example embodiment, a method of generating plural lighting functions from a lighting device comprises: coupling a first light source to an edge of a light guide panel; controllably outputting light from the first light source via an exit surface of the light guide panel in accordance with a first light function; and controllably operating a second light source to generate backlighting relative to a rear surface of the light guide panel to output light from the second light source via the exit surface of the light guide panel in accordance with one or more second light functions.

In accordance with aspects of the example embodiment, the second light source comprises a plurality of light emitting diodes (LEDs) and the controllably operating the second light source comprises powering selected ones of the plurality of LEDs to generate one or more second light functions including one or more of: at least part of another vehicle lighting function, and a display including one or more display elements presenting at least one of: a designated pattern, a symbol, a pictogram, and an animation, and the one or more second light functions are outputted from the exit surface of the light guide panel.

In accordance with an example embodiment, the method of generating plural lighting functions from a lighting device further comprises coupling light from the second light source to the rear surface of the light guide panel via a material layer configured obscure visibility of the plurality of light emitting diodes (LEDs) to a user at the an exit surface of the light guide panel when the second light source is powered off.

In accordance with aspects of the example embodiment, the method of generating plural lighting functions from a lighting device further comprises optically bonding the material layer to at least one of an exit surface of the second light source and the rear surface of the light guide panel.

In accordance with aspects of the example embodiment, the method of generating plural lighting functions from a lighting device further comprises receiving signals indicating real-time conditions, and controllably operating selected ones of the plurality of LEDs to generate elements a selected display element chosen from among a plurality of display elements based on the received signals.

In accordance with aspects of the example embodiment, the receiving signals includes using Vehicle-to-Everything (V2X) communications.

In accordance with aspects of the example embodiment, the one or more second light functions includes two or more different second light functions, the plurality of LEDs of the second light source comprise different colors of LEDs, and controllably operating the second light source comprises controlling LEDs having respective ones of the different colors independently of each other to provide the two or more different second light functions.

It will be appreciated that any of the aspects of this summary can be combined with other aspects in this summary as well as with the various embodiments described below.

BRIEF DESCRIPTION OF THE DRAWINGS

Advantages of the present disclosure will be readily appreciated, as the same becomes better understood by reference to the following detailed description when considered in connection with the accompanying drawings.

FIGS. 6A, 6B, 6C and 6D are schematic diagrams of the respective operational states shown in FIGS. 5A, 5B, 5C and 5D.

DETAILED DESCRIPTION OF EXAMPLE EMBODIMENTS

Surface Element Lighting (SEL) developed by the current assignee is an example solution to replicate organic light non-automotive applications in automotive lighting applications. SEL comprises panels that become light emitting surfaces due to redirection of light from a light source coupled from the bottom or other edge of the panel. In accordance with aspects of example embodiments described herein, improved SEL devices are provided that can be implemented as single panels which can be regrouped inside a vehicle lamp and separately controlled. Further, in vehicle lighting applications such as rear lighting applications, for example, various embodiments described herein advantageously enable lamps on vehicles to show display information (e.g., pictograms, animations) or one or more vehicle lighting functions using a substrate of micro-LEDs or mini-LEDs outputting light toward a rear surface of a light guide panel, while maintaining another vehicle lighting function as a homogenous illuminated surface using a LED light source inputted at an edge surface of the light guide panel.

The present disclosure provides a light emitting diode (LED)-based lighting device configured to provide two or more lighting functions using the same exit surface of a light guide panel. A first lighting function is a vehicle lighting function such as a rear tail light function or rear combination lamp function (e.g., brake signal, turn signal, and backup light) provided by a first light source comprising a light emitting diode (LED) light source inputted at an edge surface of the light guide panel. One or more second light functions are implemented by a second light source 208 comprising a substrate of micro-LEDs or mini-LEDs outputting light toward a rear surface of the light guide panel and individually controllable as respective pixels. The second light functions include one or more of: at least part of another vehicle lighting function (e.g., a brake signal or tail light), and a display including one or more display elements presenting at least one of: a designated pattern, a symbol, a pictogram, and an animation. The lighting functions provided by the first and second light sources are independently controllable with respect to each other. The present disclosure further relates generally to a unitary lighting device being controlled to selectively provide all, some, none of these lighting functions for superior appearance and design versatility.

Figure 1A:
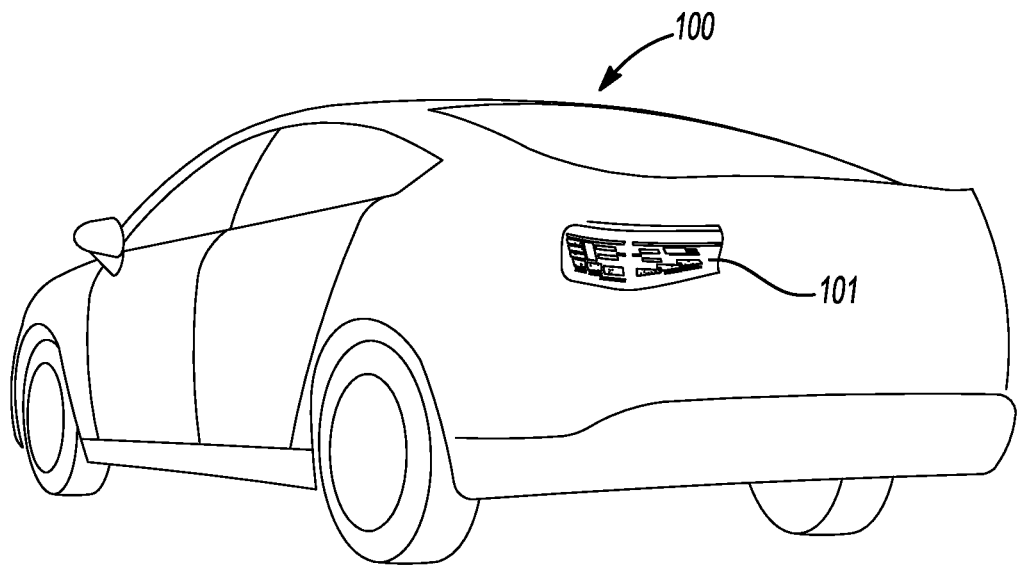
FIG. 1A is a perspective view of a vehicle with an example lighting assembly having surface element lighting panels.
Figure 1B:
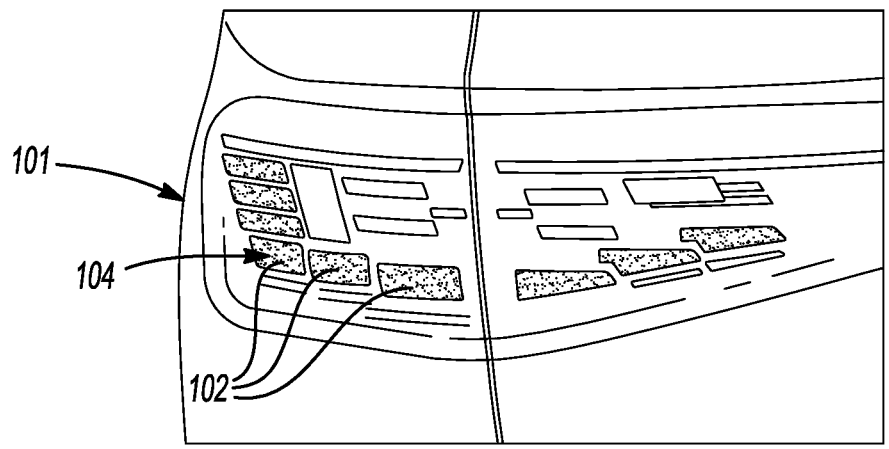
FIG. 1B is a partial perspective view of the example lighting assembly shown in FIG. 1A.

FIGS. 1A and 1B depict an example vehicle 100 with a vehicle lighting assembly 101 implementing SEL using a LED light source inputted at an edge surface of a light guide panel (e.g., the light guide panel 108 in FIG. 2C) for a vehicle lighting function (e.g., part of a turn signal), but no display function or other vehicle lighting function (e.g., part of a brake light and/or tail light) is implemented using a substrate of micro-LEDs or mini-LEDs outputting light toward a rear surface of the panel as described with reference to example embodiments in FIGS. 6A-6C. The vehicle lighting assembly 101 shown in FIGS. 1A and 1B is, for example, an example rear lighting assembly that has a first function such as a brake light and comprises a plurality of SEL devices 102 arranged in a pattern indicated generally at 104. In other words, the vehicle lighting assembly 101 can include several SEL devices 102, each of which has a LED light source that is coupled to a light guide to create a corresponding light guide panel 108 with homogenous light output, but without any capability to show display content or additional vehicle lighting operation(s) using a different light source such as a tail light using micro-LEDs or mini-LEDs outputting light toward a rear surface of the light guide panel 108.

Figure 2A:
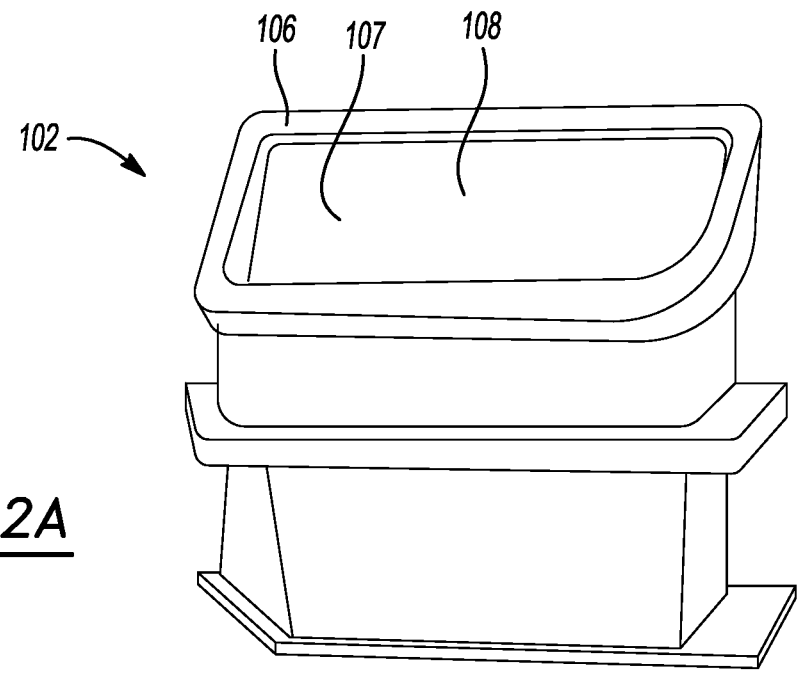
FIGS. 2A, 2B and 2C are, respectively, a perspective view, an exploded view and a schematic view of an example surface element lighting device.
Figure 2B:
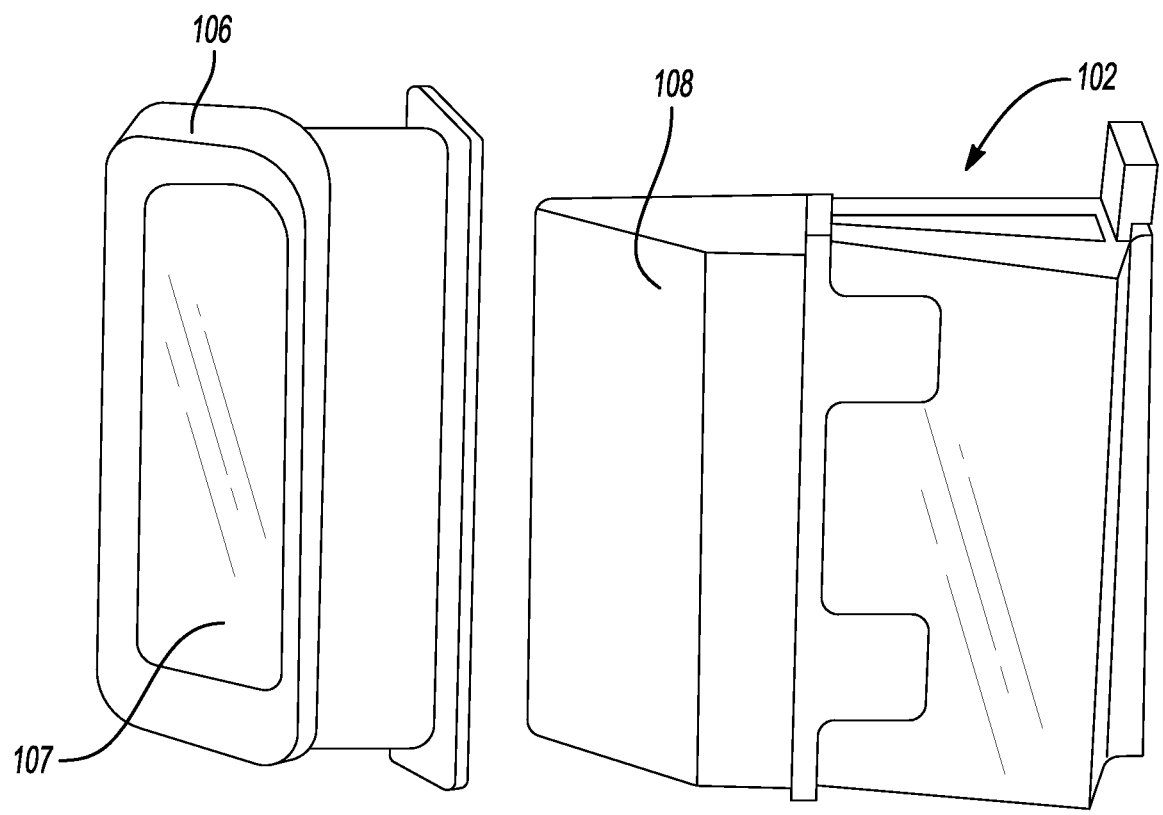
Figure 2C:
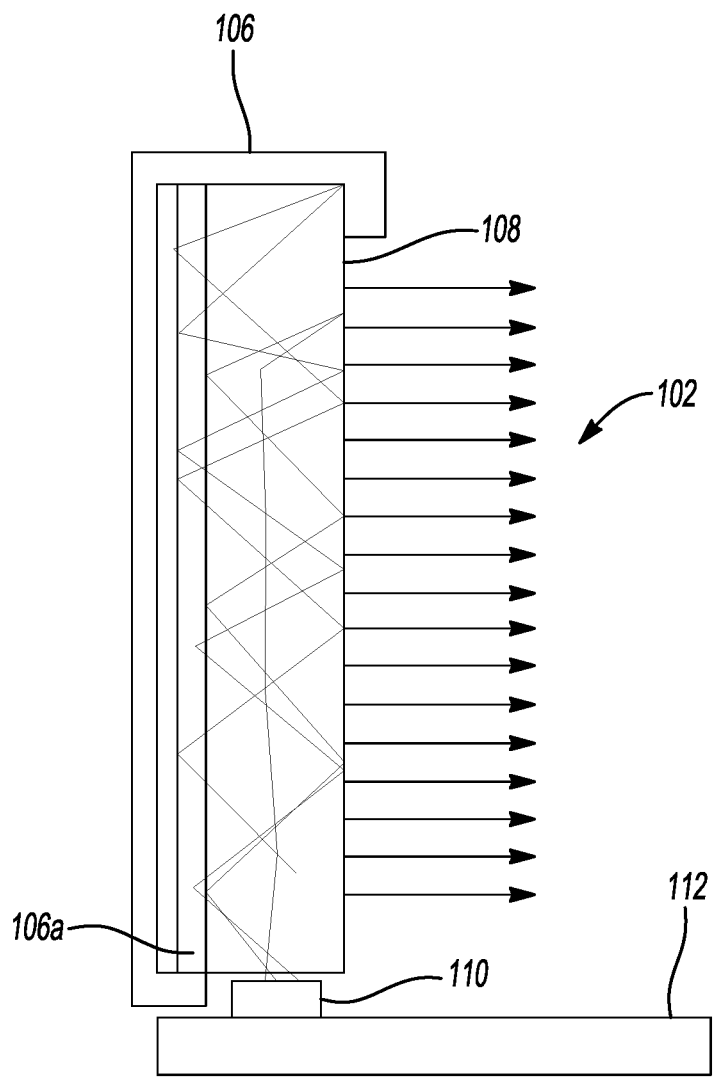
Figure 3A:
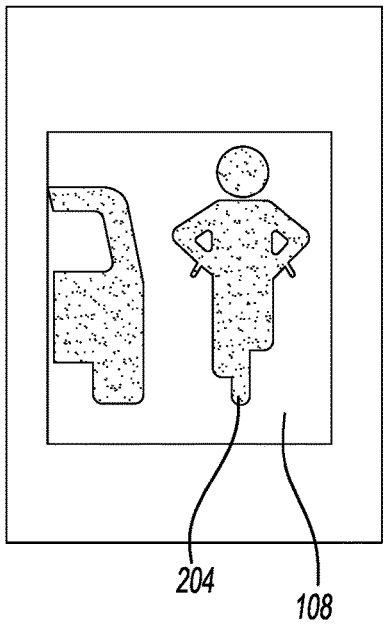
FIGS. 3A, 3B, 3C, 3D, 3E and 3F depict respective example improved surface element lighting devices for use in a vehicle lighting assembly wherein LEDs in a matrix are provided in an improved surface element lighting device and separately controlled as pixels to generate a graphic display within a surface element lighting panel in accordance with an example embodiment.
Figure 3B:
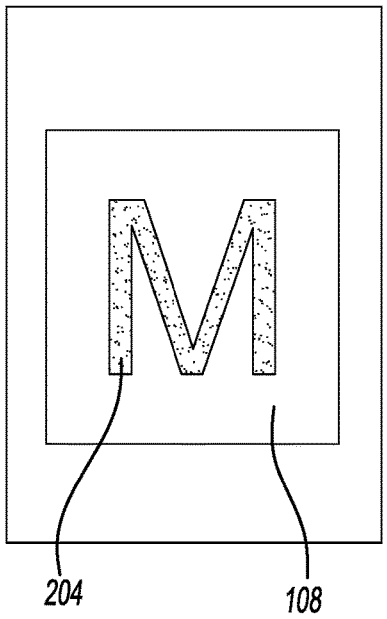
Figure 3C:
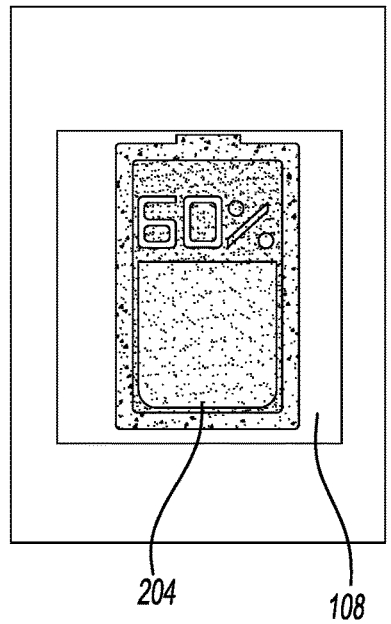
Figure 3D:
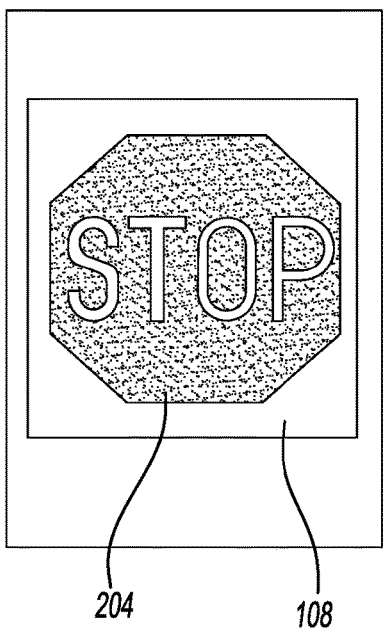
Figure 3E:
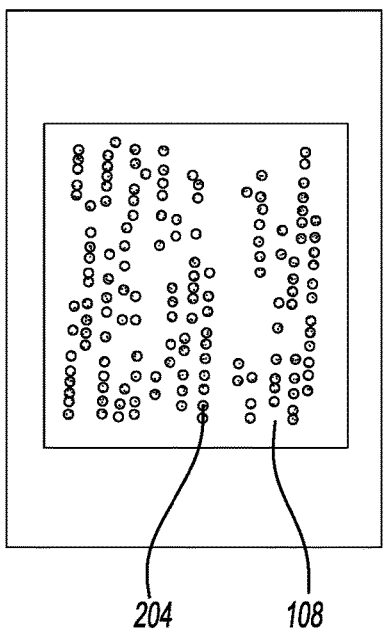
Figure 3F:
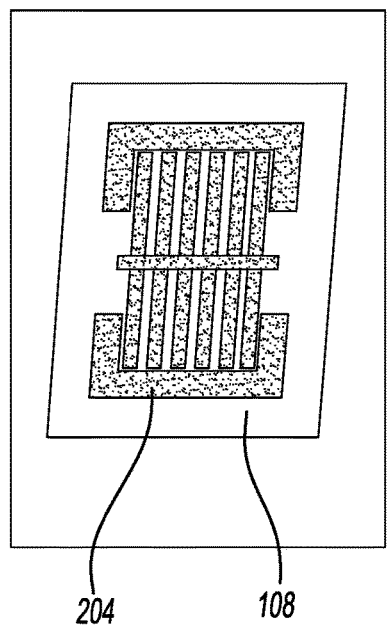

More specifically, and with reference to FIGS. 2A, 2B and 2C, the SEL device 102 can have a printed circuit board (PCB) or a substrate 112 for one or more first light sources 110, such as LEDs. The first light sources 110 are provided to an edge surface of a light guide panel 108 (e.g., the top surface, the bottom surface, or one of the two side surfaces of an example light guide). The light guide panel 108 is configured to reflect and distribute the inputted light from the first light sources 110 across an area of the light guide panel. The light guide panel 108 is held in place with a bracket 106 that is configured to facilitate mounting of the SEL device 102 into the vehicle lighting assembly 101 of a vehicle 100. The bracket 106, which may be integrated with a housing, can be black for the frame and have a white area 106a behind the light guide panel 108 to recycle light that escapes the rear surface of the light guide panel 108. A cover plate 107 (FIG. 2A) can also be provided to seal and protect the first light sources 110 from the environment.

It is currently not possible to segment a lit area employing such SEL technology (e.g., the area of the light guide panel 108 not obscured by the frame of the bracket 106) into enough subsegments to allow display of information content similar to recent non-automotive SEL displays or lit panels (e.g., thin-file-transistor (TFT) liquid crystal displays LCDs in mobile phones and televisions with LEDs operated as pixels). In accordance with example embodiments of the present disclosure, an advantageous SEL device 202 (e.g. for use in a vehicle lighting assembly 101) is provided to controllably generate plural lighting functions using the same SEL display or light guide panel 108, wherein at least one of the lighting functions includes one or more of a display function and/or another vehicle lighting function generated using a second light source 208, such as a substrate of micro-LEDs or mini-LEDs $208_1$-$208_n$ outputting light toward a rear surface of a light guide panel 108, and the light guide panel 108 overlies the micro-LEDs or mini-LEDs $208_1$-$208_n$. The display function provided by the improved SEL device 202 can include any of: a designated pattern, a symbol, a designated arrangement of symbols, a pictogram, an alphanumeric message, an animation, among other display types for indicating decorative or informational messages and/or symbols to viewers. The improved SEL device 202 is also configured to provide at least one other lighting function using the same lit area (e.g., 108) such as a brake light, or turn signal, or daylight running light, among other exterior vehicle lighting operations, generated using a different light source such as a first light source 110 inputted at an edge surface of the same light guide panel 108.

As shown in FIGS. 3A through 3F, an example improved SEL device 202 comprises a matrix of mini-LEDs (e.g., $208_1$-$208_n$ in FIGS. 4 though 6D) used to create a pixel matrix and each of these LEDs can be controlled separately. For example, different patterns of a plurality of second light sources $208_1$-$208_n$ are selectively operated to create respective symbols or pictograms wherein each of second light sources 208 can be a controllable pixel to significantly achieve more detailed and varied display content than possible with an OLED-based system deployed for vehicle lighting applications, wherein the OLED panel can only be segmented into a relatively small number of subsegments for display of only a basic simple shape or symbol, and therefore incapable of representing display information that is fine versus very coarse. By contrast, respective light guide panels or portions of a light guide panel 108 in an improved SEL device 202 are shown in FIGS. 3A through 3F with respective example display function symbols or pictograms that are much more refined than a simple shape or symbol such as a disabled vehicle pictogram 204a, a corporate branding symbol 204b, a battery charge indicator symbol 204c, a stop sign symbol 204d, a pixilated pattern 204a, and a warning symbol 204f.

It is to be understood that the example symbols or pictograms 204 shown in FIGS. 3A through 3F are not exhaustive and that, in accordance with example embodiments of the present disclosure, other symbols or pictograms 204 can be determined that intuitively communicate an intended message or meaning to a viewer. Further, the symbols or pictograms 204 can be controlled to be static, dynamic (e.g., flashing, sequenced), or animated. In addition, example embodiments of the present disclosure can employ Vehicle-to-X (Vehicle-to-Everything or V2X) communication for real-time information exchange with a controller for the SEL device 202 display function to generate up-to-date display function symbols that reflect current vehicle 100 or traffic or other conditions. For example, cars and/or commercial vehicles can be enabled by their corresponding vehicle lighting assemblies 101 with improved SEL devices 202 to display and otherwise exchange information related to real-time traffic updates and road hazard information to implement enhanced safety assist functions.

The second light sources $208_1$-$208_n$ in an improved SEL device 202 can also be selectively operated to create portions of other vehicle lighting functions such as a tail light, brake light or turn signal. Further, two or more different colors of the second light sources $208_1$-$208_n$ can be provided to output light toward the rear surface of the light guide panel 108, and selectively controlled to provide two or more lighting functions, making the improved SEL device 202 at least a three function module. For example, the first light sources 110 provided to an edge surface of the light guide panel 108 of the improved SEL device 202 can be controlled to illuminate as part of a turn signal. The second light sources $208_1$-$208_n$ having a first color (e.g., red) can be controlled to illuminate as at least part of a brake signal, while ones of the second light sources $208_1$-$208_n$ having a second color (e.g., yellow) can be controlled to illuminate as at least part of a tail signal. All three signals are outputted from the same light guide panel 108 of the improved SEL device 202. It is understood that different numbers of and types of lighting functions of the light sources $208_1$-$208_n$ can be generated, and using different combinations of colors of the second light sources $208_1$-$208_n$.

As stated above, FIGS. 1A and 1B show a vehicle 100 in which an example vehicle lighting assembly 101 is installed such as a rear tail light, or a rear combination lamp (RCL) having a combination of brake lamps that are turned on when the brake pedal is pressed, turn signal lamps that inform the change of the direction of an automobile, and backup lamps, which are turned on when the vehicle is put into reverse gear. In accordance with aspects of example embodiments of the present disclosure, a technical solution is provided by at least one improved SEL device 202 incorporated into a vehicle lighting assembly 101 wherein the SEL device 202 is operated to provide at least a first function (e.g., a tail light, or any combination of brake light, turn signal and backup signal, or a portion of the tail light or other rear lighting indicator) using the first light sources 110 provided to an edge surface of the light guide panel 108, and at least a second function that is a display function (e.g., display of decorative or informational symbol(s) or pattern(s)) or another vehicle lighting function (e.g., a brake light or tail light or reverse light), using a different light source such as the second light sources $208_1$-$208_n$ that output light toward the rear surface of the same light guide panel 108. In other words, the improved SEL device 202 combines surface element lighting or SEL technology (e.g., first light sources 110 coupled into a light guide panel 108 for at least a first light function) with direct lighting, high resolution backlighting behind the same light guide panel 108 for one or more second light functions, whereby light for the second light functions (which can include a display function and/or another vehicle lighting function) is transmitted through the same light guide panel 108 used for the first light function. As described in more detail below, micro-LEDs or mini-LEDs are used for the backlighting (e.g., Chip Scale Package or CSP LEDs on a thin substrate) to keep the package of the SLE device 202 compact and especially to minimize package thickness. Both lighting elements, that is, the first light sources 110 for the first light function, and the CSP LEDs for the second light function (e.g. the second light sources $208_1$-$208_n$ in FIGS. 4 though 6D) are driven independently.

The example embodiments of the improved SEL device 202 described herein have at least two lighting functions, that is, a first light function (e.g., a vehicle lighting function such as a tail light) using the first light sources 110 provided to an edge surface of a light guide panel 108, and one or more second light functions such as a display function and/or one or more other vehicle lighting function using the second light sources $208_1$-$208_n$ that output light toward the rear surface of the same light guide panel 108. Thus, an improved SEL device 202 can have plural mini-LED displays or multiple display functions. Also, plural SEL devices 202 can be grouped and controlled in a lighting assembly 101 to generate portions of a designated signal, pattern, symbol or pictogram. Also, it is to be understood that the first light function can be a different lighting function besides a rear lighting function as long as the SEL device(s) and/or the vehicle lighting assembly 101 is/are configured to meet relevant regulatory and safety specifications.

Figure 4:
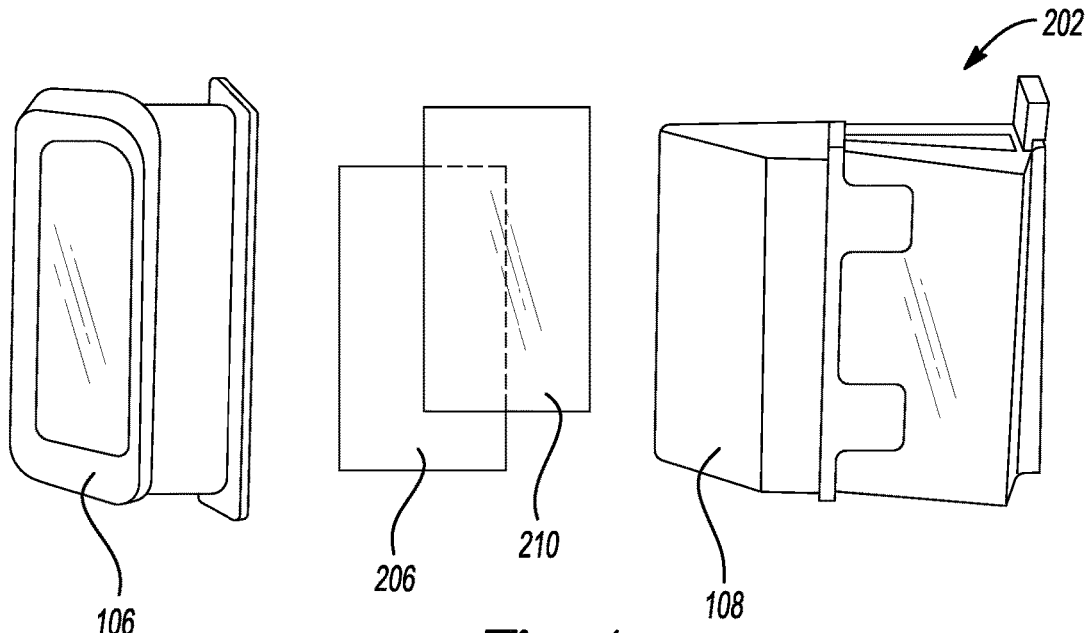
FIG. 4 is an exploded view of an example improved surface element lighting device for integration in a vehicle lighting assembly to provide both a conventional vehicle lighting function (e.g., tail light or brake light) using a LED light source inputted at an edge surface of a light guide panel, and at least one other vehicle lighting function and/or new display function using a substrate of micro-LEDs or mini-LEDs outputting light toward a rear surface of the light guide panel in accordance with an example embodiment.

FIG. 4 is an exploded view of an example improved SEL device 202 constructed in accordance with an example embodiment to have a first light function and a second light function. The improved SEL device 202 is shown as being packaged into a similar form factor as the SEL device 102 shown in FIGS. 2A-2C. For example, the SEL device 202 is provided with a similar light guide panel 108 and bracket 106. As illustrated in FIGS. 6A-6D, the light guide panel 108 in the SEL device 202 is configured to reflect and distribute the inputted light from the first light sources 110 across an area of the light guide panel. In accordance with an advantageous aspect of example embodiments of the present disclosure, the SEL device 202 is also provided with a LED substrate 206 provided with second light sources 208 including micro-LEDs or mini-LEDs (e.g., CSP LEDs $208_1$-$208_n$ on a thin substrate 206). The PCBA material of the substrate 206 for the second light sources 208 of CSP LED type can be white to optimize lighting results. In addition, a material layer 210 is disposed between the emitting or front side of the second light sources 208 of CSP LED type, and a rear side of the light guide panel 108. The material layer 210 can comprise micro Fresnel lenses to boost light from the second light sources 208 of CSP LED type to the rear surface of the light guide panel 108, and can block a viewer from seeing the second light sources 208 of CSP LED type when looking into the front surface of the light guide panel 108. As described below with regard to FIGS. 5A-5D, the SEL device 202 provides a first light function (e.g., a vehicle lighting function such as a tail light or brake light or turn signal function) that is implemented using first light sources 110, such as packaged LEDs, from an edge surface below the light guide panel 108 overlaid with a second light function comprising one or more of a display function (e.g., a designated pattern, a symbol, a pictogram, or an animation) and/or a vehicle lighting function (e.g., a tail light or brake light function) implemented using second light sources 208 of mini-LED type, and the same light guide panel 108 output surface as the first light function to achieve at least two lighting functions using the same assembly.

The material layer 210 can include a foil such as a Brightness Enhancement Film (BEF) foil configured to manage the angular output of light from liquid crystal display backlights using, for example, a prismatic structure to focus light towards on-axis viewers of the display such as BEF3-T-155n Auto, BEF3-T-205 ASn Auto, or AEF-155 that are commercially available from 3M™. It is to be understood that other foils can be used. The material layer 210 can be optimized for a given application by calculating Fresnel optics to have maximum light boosting function while preventing look through from typical viewing angles of the front surface of the light guide panel 108. The material layer 210 can be bonded to the CSP LED substrate 206, to the light guide panel 108, or to both.

The first light sources 110 can be controlled by a first controller 114 to operate in accordance with the first light function (e.g., a vehicle rear lighting function such as a tail light or brake light) indicated generally at 104. The second light sources $208_1$-$208_n$ of CSP LED type can be controlled by a second controller 214 to provide the one or more second light functions indicated generally at 204. The controllers 114 and 214 can be integrated with the respective substrates 112 and 206, or disposed separately therefrom (e.g., in a vehicle electronic control unit (ECU)).

Figure 5A:
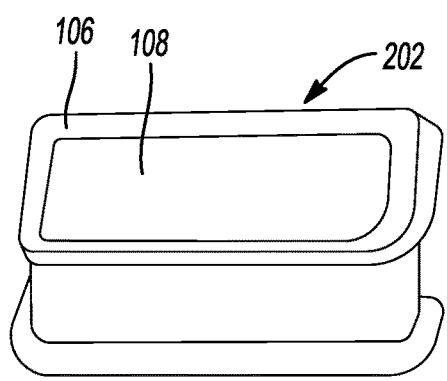
FIGS. 5A, 5B, 5C and 5D illustrate different operational states of the improved surface element lighting device shown in FIG. 4 in accordance with example embodiments.
Figure 5B:
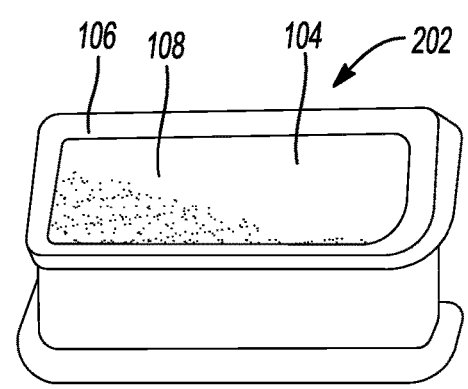
Figure 5C:
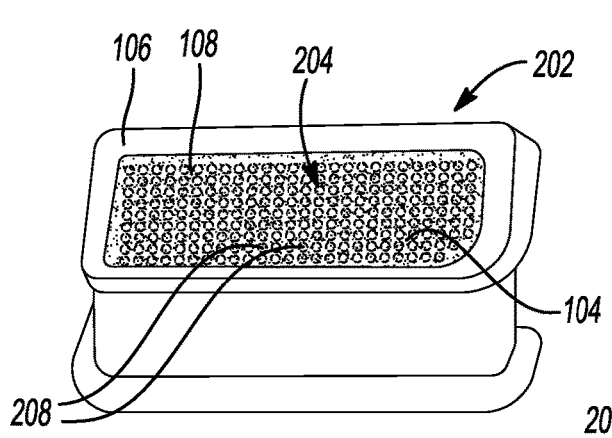
Figure 5D:
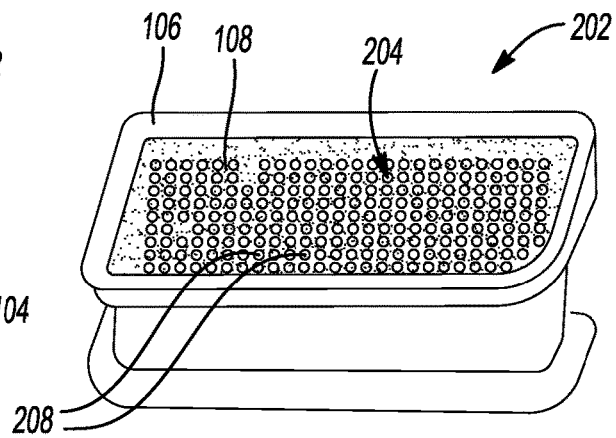

As stated above, the first light sources 110 and the second light sources 208 of CSP LED type can be controlled independently of each other via their respective controllers 114 and 214. FIGS. 5A, 5B, 5C and 5D illustrate different operational states of the improved vehicle lighting assembly shown in FIG. 4 in accordance with example embodiments. FIGS. 6A, 6B, 6C and 6D are schematic diagrams of the respective operational states shown in FIGS. 5A, 5B, 5C and 5D. FIGS. 5A and 6A illustrate the light guide panel 108 front surface appearance when the first light sources 110 and the second light sources 208 are off. FIGS. 5B and 6B illustrate the light guide panel 108 front surface output when the first light sources 110 are on, and the second light sources 208 are off. In other words, a viewer will see a homogenous first light function 104 such as a tail light or brake light or turn indicator. FIGS. 5C and 6C illustrate the light guide panel 108 front surface output when the first light sources 110 and the second light sources 208 are on. In other words, a viewer will see a first light function 104 such as a brake light, as well as a second light function(s) 204 (e.g., display function such as a traffic hazard or disabled vehicle warning symbol, and/or at least part of another vehicle lighting function such as a tail light). FIGS. 5D and 6D illustrate the light guide output when the first light sources 110 are off, and the second light sources 208 are on to output only a second light functions 204 (e.g., a display function such as a designated pattern, symbol, pictogram or animation, and/or at least part of another vehicle lighting function such as a tail light) via the light guide panel 108.

Figure 7A:
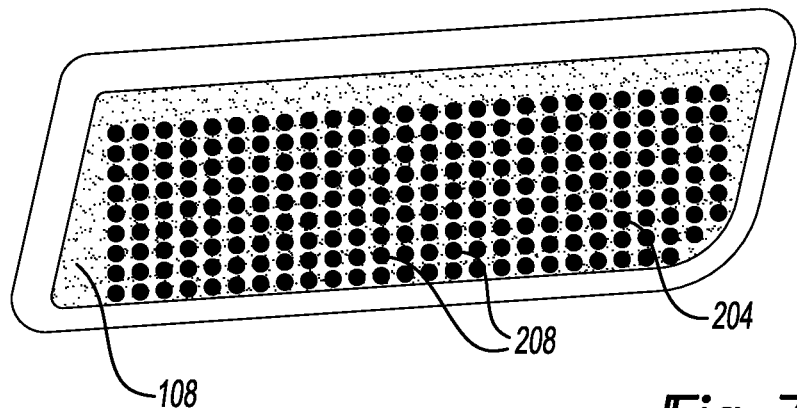
FIGS. 7A, 7B and 7C illustrate different display functions of an improved surface element lighting device in accordance with example embodiments.
Figure 7B:
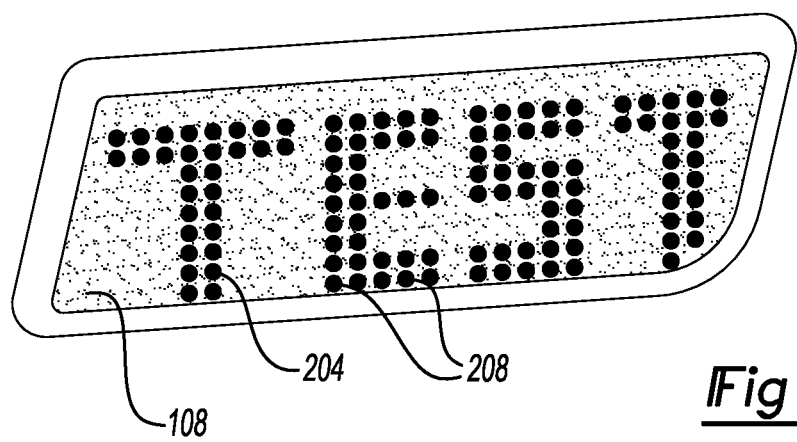
Figure 7C:
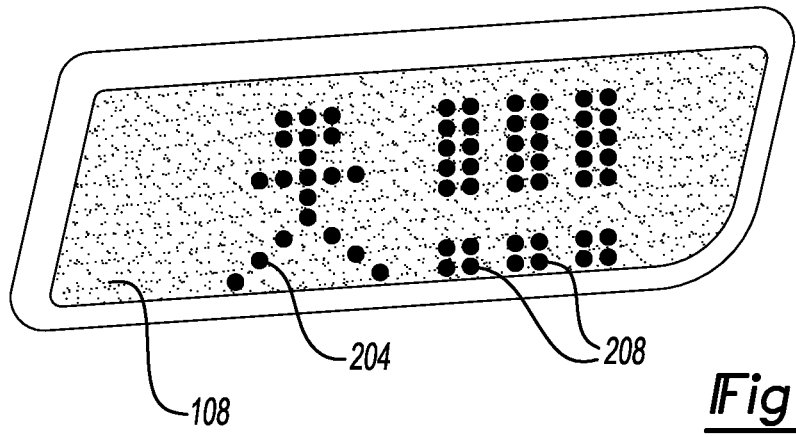

The CSP LEDs $208_1$-$208_n$ of the second light sources 208 can include unpackaged LED dies (e.g., mini LED dies or micro LED dies) $208_{1, \ldots, n}$ that can be spaced densely on a substrate 206 and controllably switched independently with respect to each other to create the second light function display pattern or symbol or animation or pictogram 204. For example, as shown in FIG. 7A, the LED dies $208_{1, \ldots, n}$ are all switched on. The LED dies $208_{1, \ldots, n}$ are selectively switched to create two respective display functions as shown in FIGS. 7B and 7C. Micro-sized, high-performance LED packages are employed that are, for example, Chip Scale Package or CSP LEDs instead of traditional Surface Mounted Devices (SMD) LED chips. Since CSP LED chips can be directly applied to a PCB, and omit the SMD LED chip holder and wires connecting to the PCB, they effectively shorten the heat flow path to the substrate, reduce the thermal resistance of the light source and, under the same current, have higher intensity and lower current consumed compared to SMD chips.

The SEL device 202 is advantageous over OLED panels for vehicle lighting applications. Using OLED panels in automotive lighting applications is expensive and not versatile. For example, multiple high cost OLED panels need to be placed even when only some of them are needed to provide a display capability. Because example embodiments of the present disclosure can provide plural functions including a second light function implemented using second light sources $208_1$-$208_n$ that output light toward the rear surface of the same lit area or panel of a first light source 110, one or more improved SEL devices 202 can be deployed, and/or a SEL device 202 can be integrated among unimproved SEL devices 102 in a vehicle lighting assembly 101, and be selectively operated when the second light function is needed. The lighting functions of these improved SEL devices 202 can be homogenous during first light function lighting operations, and provide complementary display functions having similar intensity. By contrast, an OLED panel has a very distinct appearance than the lit area of the SEL devices 202 and 102 and therefore are very difficult to combine with them.

As stated above, the symbols, patterns (e.g., stripes, bubbles, and the like), pictograms or animations from a display function of the improved SEL device 202 can be generated that are much more refined than, for example, an OLED lit panel having a small number of subsegments to represent a simple or basic shape or symbol, because each of the second light sources 208 is controllable as a working pixel for designated displays by the controller 214 to achieve more detailed displayed content and therefore a significantly higher level of possibilities to create and animate content. The second light sources 208 of CSP LED type may have a pitch of about 2 millimeters (mm) in the example embodiment of the SEL device 202 shown in FIGS. 5A-5D, but can be on the order of 0.5 mm to 1.0 mm to have pitch and resolution for an exterior vehicle lighting display function that is similar to typical TFT liquid crystal displays, for example, and advantageously integrated with another lighting function in accordance with example embodiments of the present disclosure.

The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the present disclosure. In some example embodiments, well-known processes, well-known device structures, and well-known technologies are not described in detail, as they will be readily understood by the skilled artisan in view of the disclosure herein.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A lighting device comprising:
   a first light source controlled to operate in accordance with a first light function corresponding to a vehicle lighting function;
   a second light source comprising a plurality of light emitting diodes (LEDs) disposed on a substrate and controlled to operate in accordance with one or more second light functions including one or more of: at least part of another vehicle lighting function, and a display including one or more display elements arranged in a two-dimensional pattern and presenting at least one of: a designated pattern, a symbol, a pictogram, and an animation; and
   a light guide panel having edge surfaces, a front surface, and a rear surface overlying the second light source to receive therefrom, the light guide panel configured to receive light from the first light source via at least one of the edge surfaces and to output light from the front surface in accordance with the first light function; and
   wherein the light guide panel is further configured to output light from the second light source via the front surface in accordance with the one or more second light functions.

2. The lighting device of claim 1, wherein the plurality of LEDs of the second light source are chosen from mini LEDs and micro LEDs, and LED dies.

3. The lighting device of claim 2, wherein the LEDs in the first light source are Surface Mounted Devices (SMD) LEDs.

4. The lighting device of claim 1, further comprising a material layer configured to obscure visibility of the plurality of LEDs to a user at the front surface of the light guide panel when the second light source is powered off.

5. The lighting device of claim 4, wherein the material layer is disposed between an output surface of the second light source and the rear surface of the light guide panel.

6. The lighting device of claim 5, wherein the material layer is bonded to at least one of an exit surface of the second light source and the rear surface of the light guide panel.

7. The lighting device of claim 5, wherein the material layer includes a foil.

8. The lighting device of claim 7, wherein the material layer includes a brightness enhancement film (BEF) foil comprising a prismatic structure configured to focus light towards on-axis viewers of the front surface of the light guide panel.

9. The lighting device of claim 1, wherein the first light function includes at least one of: a brake light, a tail light, a turn signal, and a backup light.

10. The lighting device of claim 1, wherein the first light source and the second light source are controlled independently of each other.

11. The lighting device of claim 1, wherein the second light source is controlled by a controller that is configured to receive signals indicating real-time conditions via Vehicle-to-Everything (V2X) communications and to operate the second light source to output a selected display element chosen from among a plurality of display elements based on the received signals.

12. The lighting device of claim 1, wherein the one or more second light functions includes two or more different second light functions, and
   wherein the plurality of LEDs of the second light source comprise different colors of LEDs, and LEDs having respective ones of the different colors can be controlled to operate independently of each other to provide the two or more different second light functions.

13. A method of generating plural lighting functions from a lighting device, comprising:
   coupling a first light source to an edge of a light guide panel;
   controllably outputting light from the first light source via an exit surface of the light guide panel in accordance with a first light function; and
   controllably operating a second light source to generate backlighting relative to a rear surface of the light guide panel to output light from the second light source via the exit surface of the light guide panel in accordance with one or more second light functions including one or more of: at least part of another vehicle lighting function, and a display including one or more display elements arranged in a two-dimensional pattern and presenting at least one of: a designated pattern, a symbol, a pictogram, and an animation.

14. The method of claim 13, wherein the second light source comprises a plurality of light emitting diodes (LEDs) and the controllably operating the second light source comprises powering selected ones of the plurality of LEDs in accordance with the one or more second light functions, and
   wherein the one or more second light functions are outputted from the exit surface of the light guide panel.

15. The method of claim 14, further comprising receiving signals indicating real-time conditions, and controllably operating selected ones of the plurality of LEDs to generate elements a selected display element chosen from among a plurality of display elements based on the received signals.

16. The method of claim 15, wherein the receiving signals includes using Vehicle-to-Everything (V2X) communications.

17. The method of claim 14, wherein the one or more second light functions includes two or more different second light functions, and
   wherein the plurality of LEDs of the second light source comprise different colors of LEDs, and controllably operating the second light source comprises controlling LEDs having respective ones of the different colors independently of each other to provide the two or more different second light functions.

18. The method of claim 13, further comprising coupling light from the second light source to the rear surface of the light guide panel via a material layer configured obscure visibility of the second light source to a user at the an exit surface of the light guide panel when the second light source is powered off.

19. The method of claim 18, further comprising optically bonding the material layer to at least one of an exit surface of the second light source and the rear surface of the light guide panel.

20. A lighting, device comprising:
a first light source controlled to operate in accordance with a vehicle lighting function;
a second light source comprising a plurality of light emitting diodes (LEDs) disposed on a substrate and controlled to operate in accordance with at least part of another vehicle lighting function; and
a light guide panel having edge surfaces, a front surface, and a rear surface overlying the second light source to receive therefrom, the light guide panel configured to receive light from the first light source via at least one of the edge surfaces and to output light from the front surface in accordance with the first light function; and
wherein the light guide panel is further configured to output light from the second light source via the front surface in accordance with the one or more second light functions.

* * * * *